(12) United States Patent
Allgaier

(10) Patent No.: US 9,094,536 B2
(45) Date of Patent: Jul. 28, 2015

(54) POWER SUPPLY SYSTEM FOR A FIELD DEVICE WITH A RADIO MODULE

(71) Applicant: Volker Allgaier, Haslach I.K. (DE)

(72) Inventor: Volker Allgaier, Haslach I.K. (DE)

(73) Assignee: VEGA GRIESHABER KG, Wolfach (DE)

(*) Notice: Subject to any disclaimer, the term of this patent is extended or adjusted under 35 U.S.C. 154(b) by 131 days.

(21) Appl. No.: 13/793,660

(22) Filed: Mar. 11, 2013

(65) Prior Publication Data

US 2014/0106687 A1 Apr. 17, 2014

Related U.S. Application Data

(60) Provisional application No. 61/702,290, filed on Sep. 18, 2012.

(30) Foreign Application Priority Data

Sep. 12, 2012 (EP) .................................... 12184038

(51) Int. Cl.
*H04B 5/00* (2006.01)
*G08C 19/06* (2006.01)
*H04M 19/08* (2006.01)
*H02J 5/00* (2006.01)
(Continued)

(52) U.S. Cl.
CPC ............... *H04M 19/08* (2013.01); *H01F 38/14* (2013.01); *H02J 5/005* (2013.01); *H02J 7/025* (2013.01)

(58) Field of Classification Search
CPC ..... G01D 11/245; G08C 19/06; H04M 19/08; H01F 38/14; H02J 7/025; H02J 7/02

USPC ......... 455/41.1, 41.2, 556.1, 550.1, 558, 572, 455/573, 575.1, 39, 343.1; 340/870.05, 340/870.01, 870.07, 870.16, 870.17, 340/870.31, 870.32, 870.39
See application file for complete search history.

(56) References Cited

U.S. PATENT DOCUMENTS 6,668,636 B2 * 12/2003 Nantz et al. .................. 73/146.4
6,705,898 B2 * 3/2004 Pechstein et al. ............. 439/660
6,838,985 B2 * 1/2005 Ghabra et al. ................ 340/445
(Continued)

FOREIGN PATENT DOCUMENTS

CN 101 577 505 11/2009
DE 103 44 575 4/2005
(Continued)

OTHER PUBLICATIONS

European Appln. Patent Serial No. 12184038.3 Office Action mailed Feb. 21, 2013, 8 pages—German, 5 pages—English.
(Continued)

*Primary Examiner* — Pablo Tran
(74) *Attorney, Agent, or Firm* — Andrew F. Young, Esq.; Lackenbach Siegel, LLP

(57) ABSTRACT

The invention concerns a power supply system for a field device connected to a wire-line network with a radio module configured for data communication with an external unit, wherein the radio module is connected to the field device and has a power supply unit. The power supply adapter is provided with a power transmitter for the wireless power transfer to the power supply unit. The power supply unit is configured with a power receiver, while the power receiver and the power transmitter are inductively coupled for the power transfer.

13 Claims, 3 Drawing Sheets

(51) Int. Cl.
*H02J 7/02* (2006.01)
*H01F 38/14* (2006.01)

(56) References Cited

U.S. PATENT DOCUMENTS

| | | | |
|---|---|---|---|
| 7,454,170 B2* | 11/2008 | Goossens et al. | 455/41.1 |
| 7,492,280 B2* | 2/2009 | Horler | 340/870.01 |
| 7,612,665 B2* | 11/2009 | Okada et al. | 340/540 |
| 8,011,255 B2* | 9/2011 | Arms et al. | 73/862.325 |
| 8,200,444 B2* | 6/2012 | Vaingast | 702/62 |
| 2007/0004168 A1 | 1/2007 | Zips | |
| 2008/0178694 A1* | 7/2008 | Barford et al. | 73/866.5 |
| 2009/0115627 A1* | 5/2009 | Duffy et al. | 340/870.3 |
| 2010/0026518 A1* | 2/2010 | Kirst et al. | 340/870.05 |

FOREIGN PATENT DOCUMENTS

| | | |
|---|---|---|
| DE | 10 2006 030 834 | 1/2008 |
| DE | 10 2006 030834 | 1/2008 |
| DE | 10 2008 029956 | 12/2009 |

OTHER PUBLICATIONS

Chinese Pat. Appln. No. 2013 1040 7647.1 Office Action issued Feb. 27, 2015, 8 pages—English, 6 pages—Chinese.

* cited by examiner

POWER SUPPLY SYSTEM FOR A FIELD DEVICE WITH A RADIO MODULE

CROSS REFERENCE TO RELATED APPLICATIONS

This application relates to and claims priority from European Application Ser. No. 12 184 038.3 filed Sep. 12, 2012 and U.S. Ser. No. 61/702,290 filed Sep. 18, 2012, the entire contents of each of which are incorporated herein fully by reference.

FIGURE SELECTED FOR PUBLICATION

FIG. 1

BACKGROUND OF THE INVENTION

1. Field of the Invention

The present invention relates to a power supply system for a field device connected to a wire-line network with a radio module. More particularly, the present invention provides a power supply system for a field device with a radio module configured for data communication with an external unit.

2. Description of the Related Art

In industrial automation, field devices are used to detect and/or set process variables. Such devices are generally connected via field bus systems (such as HART, PROFIBUS Fieldbus Foundation). The process wiring of such field devices is done at least via a two-wire line, through which the power supply of the field device comes, in addition to the data communication. The wire-line data communication can also be realized as wireless data communication, while more modern field devices are being produced with integrated radio modules, including a power source, and thus can also be operated as stand-alone units.

In order for field devices without a radio module, i.e., those which only have a communication and power supply interface, to be able to operate with a radio module (wireless module), the problem is that such a radio module cannot be supplied with energy by the field device. Therefore, such a radio module must either have its own power supply or the power supply must be wire-line type.

Thus, for example, a field device is known from DE 10 2009 047 538 A1, the entire contents of which are incorporated herein by reference, can be operated as a radio field device by outfitting it with a radio module. For this, the radio module is connected via the communication interface of the field device with the device itself and it has its own power supply source by which the field device is also supplied with energy.

In this way, a wire-line network built from several field devices can be retrofitted to a radio network, in which case the existing wire-line network is no longer needed thanks to such a conversion to a radio network.

But if not all field devices of a wire-line network can be converted or need to be converted, the method known from DE 10 2009 047 538 A1 is not applicable.

Furthermore, DE 10 2007 015 203 A1, the entire contents of which are also incorporated herein by reference, describes a wireless automation system in which a base station communicates wirelessly with several slave modules, while one slave module is connected by wireless or wire-line manner with several field devices as a sensor/actuator distributor. This sensor/actuator distributor has a wireless power supply that comes via an inductive coupling.

Finally, DE 20 2004 021 004 U1, the entire contents of which are incorporated herein by reference, proposes inductively withdrawing energy via a multistrand cable for the power supply of a field device.

Accordingly, there is a need for an improved power supply system for a field device with a radio module sufficient to overcome at least one of the detriments noted above.

ASPECTS AND SUMMARY OF THE INVENTION

In response, it is now recognized that the present invention provides a solution to overcome at least one detriment noted above, and provides a power supply system for a field device with a radio module, which is connected to a wire-line network, and which can nevertheless be placed at least in operation wirelessly in order to supply power without the radio module.

In one proposed alternative embodiment, such a power supply system for a field device connected to a wire-line network with a radio module configured for data communication with an external unit, wherein the radio module is connected to the field device and has a power supply unit, is characterized according to the invention in that a power supply adapter is provided, which has a power transmitter for the wireless power transfer to the power supply unit, and the power supply unit is configured with a power receiver, while the power receiver and the power transmitter are inductively coupled for the power transfer.

With such a power supply system it is possible to operate field devices that cannot provide any power supply for radio modules nevertheless with a wireless communication technique, or at least place them in operation wirelessly. This is especially advantageous when field devices are being operated in an explosion-endangered setting, since they must not be opened for this.

As the power transmitter and power receiver, it is advisable to use wireless power transmitter/receiver IDTP9030/9020, developed as a single chip controller by the firm IDT (Integrated Device Technology). With these two components, IDTP9030 and IDTP9020, a wireless power transfer can be realized meeting the Qi standard of the Wireless Power Consortium (the contents of which are incorporated herein by reference). Both the transmitter and the receiver allow the "multimode" type of operation and thus support proprietary formats for expanded features, improved safety and higher transmission power beyond the Qi standard.

The power receiver chip IDTP9030 offers a multi-layer foreign object detection (FOD) to make sure that no surrounding metal parts or parts placed on it can take up energy. For this, sophisticated multi-parameter algorithms are used to guarantee a high degree of safety and rule out FOD false alarms as much as possible.

Moreover, these two transmitter/receiver chips IDTP9030/9020 have protective features against excess temperature, excess voltage, and excess current.

In one advantageous alternative and optional embodiment of the invention, the power supply adapter is configured with an energy storage unit, or a battery or accumulator for the power supply to the power transmitter. Preferably, when using an accumulator as the energy storage unit, as a further modification the power supply adapter has a power receiver for the wireless power transfer from an external charging unit, wherein the power receiver is configured to supply the energy received from the external charging unit to the storage of the energy storage unit, i.e., the accumulator, for example.

According to another advantageous embodiment of the invention, a power supply adapter outfitted with the radio module is configured as an external unit to carry out the data communication with the radio module of the field device.

With such a power supply adapter as an external unit, field devices with radio modules that are supplied with energy from the outside from the power supply adapter can easily be placed in operation or an external communication can also be carried out. Preferably, the power supply adapter is configured with an energy storage unit as the power supply for the power transmitter and the radio module.

Especially advantageously, according to one modification of the invention, the power supply adapter has a communication interface and a control and monitoring unit is provided that is configured for the data communication via the communication interface with the radio module of the power supply adapter. With such a control and monitoring unit as the supervising unit in a network of field devices, field devices can easily be placed in operation and processes can be monitored and controlled.

Preferably, this communication interface with the control and monitoring unit can be configured for the wireless or wire-line data transfer.

Finally, according to another alternative advantageous aspect of the invention, the power supply adapter can be configured with a microprocessor for the control of the data communication of the radio module with the external control and monitoring unit.

In a further alternative aspect of the present invention there is provided a power supply system for a field device connected to a wire-line network with a radio module configured for data communication with an external unit, wherein the radio module is connected to the field device and has a power supply unit. The power supply adapter is provided with a power transmitter for the wireless power transfer to the power supply unit. The power supply unit is configured with a power receiver, while the power receiver and the power transmitter are inductively coupled for the power transfer.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
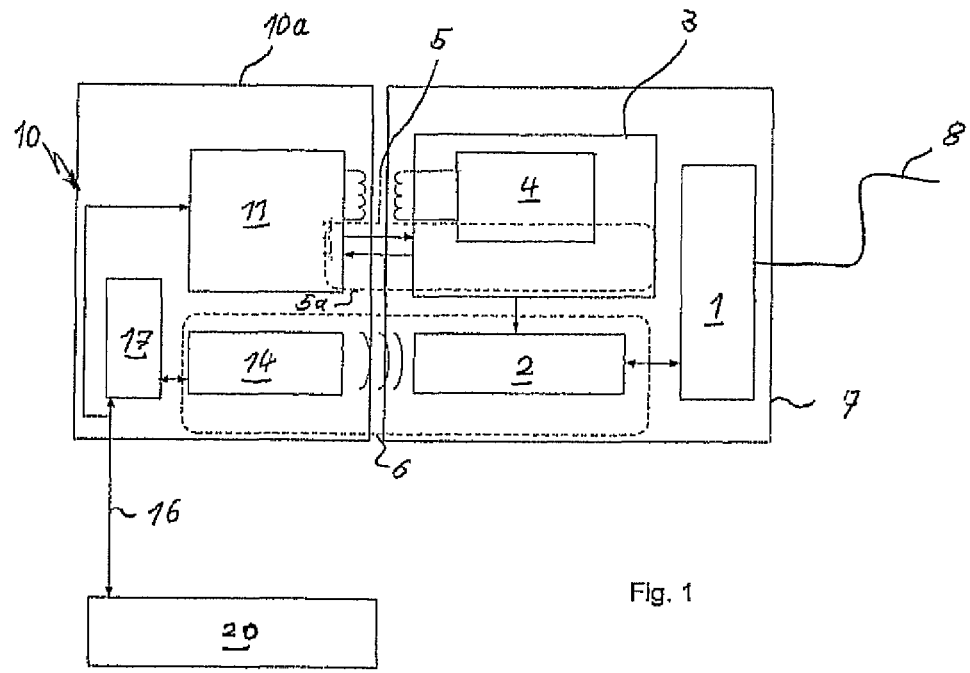
FIG. 1, a block diagram of a power supply system as a sample embodiment of the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc,) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent or that all aspects of a particular system described together are required and mandated. Instead, it is the claims the indicate the selected features claimed.

In an explosion-protected housing 7 according to the sample embodiments of FIGS. 1 to 6 there are accommodated a field device 1, a radio module 2 and, for its power supply, a power supply unit 3. Moreover, at least one two-strand process wiring 8 is led through the housing 7 into the field device 1, and by this process wiring 8 the field device 1 is connected to a wire-line network of other field devices (not shown). By this process wiring 8, both a data communication with the field device 1 and also its power supply occurs. A powering of the radio module 2 by the field device 1 is not possible, and therefore this power supply unit 3 is required.

This power supply unit 3 is outfitted with a power receiver 4, which takes up energy through an inductive coupling 5 with a power transmitter 11 of a power supply adapter 10 and provides it to the radio module 2, which is connected to the power supply unit 3 as an electrical load.

As mentioned at the outset, as the power transmitter 11 of the power supply adapter 10 and as the power receiver 4 of the power supply unit 3 one can use the wireless power transmitter IDTP9030 and wireless power receiver IDTP9020, designed as a single chip controller, and manufactured and offered by the firm IDT. Of course, other suitable components for the purpose of wireless power transfer can also be used. The transmitter IDTP9030 as the power transmitter 11 and the receiver IDTP9020 as the power receiver 4 are configured such that a communication connection 5a is also realized at the same time with the inductive coupling 5, so that an authentication, a thermal checking and a transmission of charge status can be carried out.

In the sample embodiments of FIGS. 1 to 4, the power supply adapter 10 has a radio module 14, which serves to establish a communication connection 6 with the radio module 2 connected to the field device 1, by which a data communication can be carried out.

Figure 2:
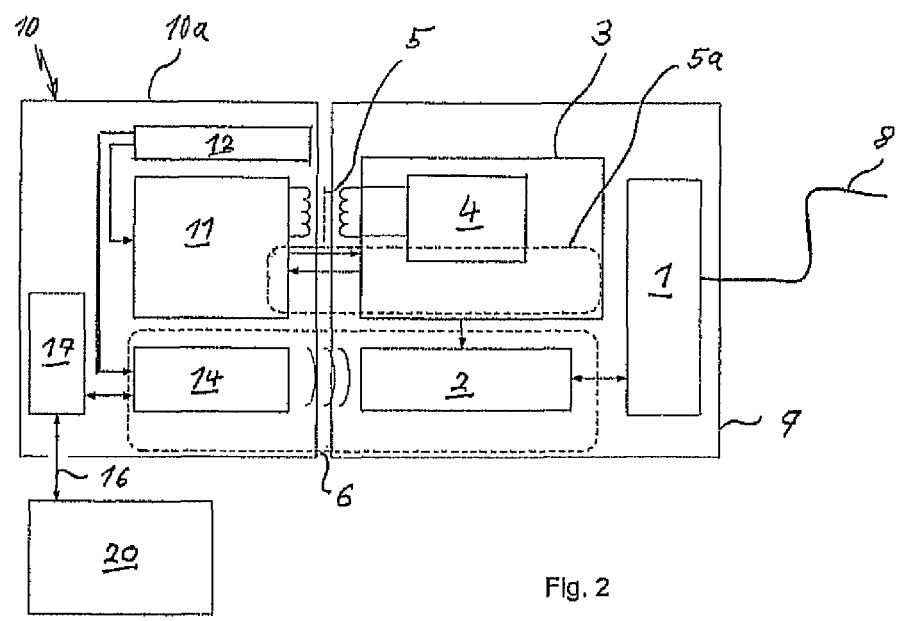
FIG. 2, a block diagram of a power supply system as another sample embodiment of the invention.

The power supply adapters 10 of FIGS. 1 and 2 are additionally outfitted with a microcontroller 17, which is connected to the radio module 14 of the power supply adapter 10 for the wire-line communication and provides a communication link to an external control and monitoring unit 20. The connection of this microcontroller 17 to this control and monitoring unit 20 occurs via an interface 16, which can be designed as a USB interface.

According to FIG. 1, the power supply of the power receiver 11 is also realized by the USB interface 16, and the radio module 14 is supplied with energy by the microcontroller 17.

Figure 4:
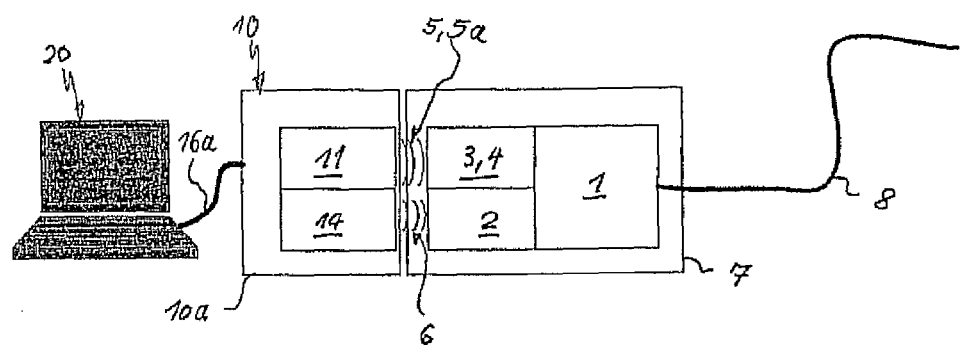
FIG. 4, a schematic representation of a power supply system according to one of FIGS. 1 to 3 with a PC as external monitoring and control unit.

FIG. 4 shows a corresponding schematic representation, where a laptop 20 as the control and monitoring unit is connected by a USB cable 16a to a power supply adapter 10, which accommodates a power transmitter 11 and a radio module 14 in a housing 10a. This power supply adapter 10 on the one hand transmits energy to the power receiver 4 of the power supply unit 3 by means of the power transmitter 11 across an inductive coupling 5 and carries out a data communication with the radio module 2 of the field device 1 via a wireless data link 6. The field device 1, the power supply unit 3 and the radio module 2 are taken up in a housing 7.

In the power supply adapter 10 of FIG. 2, the power supply of the power receiver 11 and the radio module 14 is taken from an accumulator 12 as the power storage unit. The power supply adapter 10 of FIG. 1 can also optionally be outfitted with such an accumulator 12.

The components of the power supply adapter 10 of FIGS. 1 and 2, i.e., the power transmitter 11, the radio module 14 and the microprocessor 17, as well as the accumulator 12 optionally, are arranged in a housing 10a.

Figure 3:
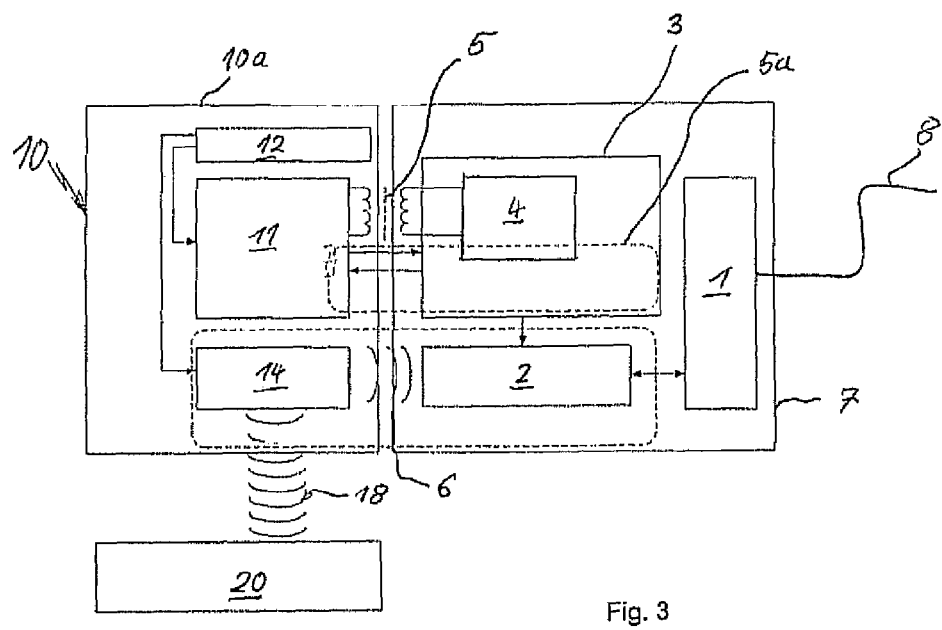
FIG. 3, a block diagram of a power supply system as another sample embodiment of the invention.

In the sample embodiment of FIG. 3, the power transmitter 11 and the radio module 14 are powered by an accumulator 12, and these components are taken up in a housing 10a.

An external control and monitoring unit 20, such as a PC, communicates via a wireless communication link 18 with the radio module 14 of the power supply adapter 10.

The wireless communication technologies used in a power supply system according to the sample embodiments per FIGS. 1 to 4 are of unified design, i.e., either according to the Bluetooth, ZigBee or ISM standard, or a standard similar to them, which are known to those of sufficient skill in the art.

Figure 5:
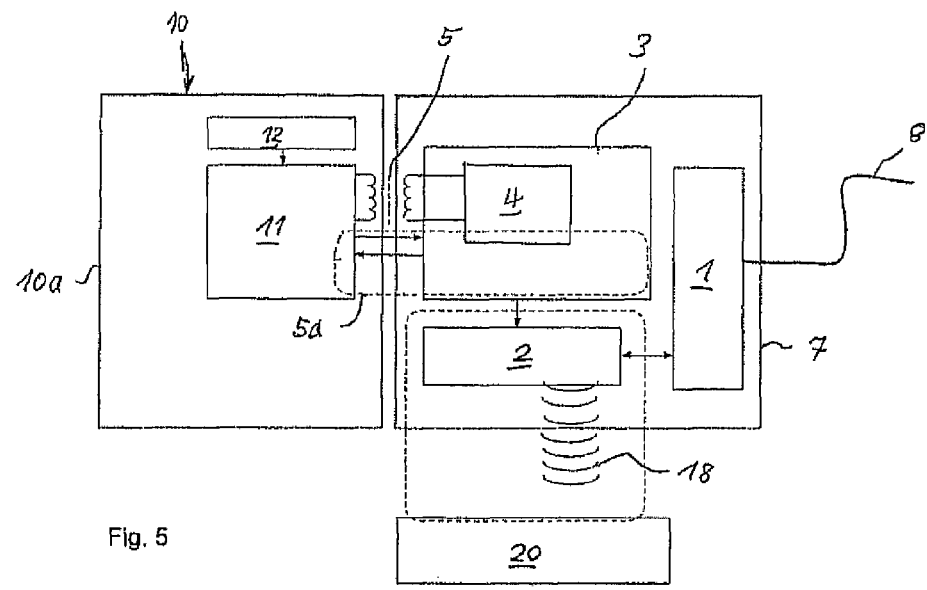
FIG. 5, a block diagram of a power supply system as another sample embodiment of the invention.

The power supply adapter 10 according to FIG. 5 contains on the power transmitter 11 in a housing 10a, as well as an accumulator 12 for the power supply of same.

An external control and monitoring unit 20 is connected via a wireless communication link 18 directly to the radio module 2, which is communication-linked to the field device 1. Here again, either the Bluetooth, ZigBee, ISM standard or similar standard is used as the technology for the data transmission in regard to the communication link 18.

Figure 6:
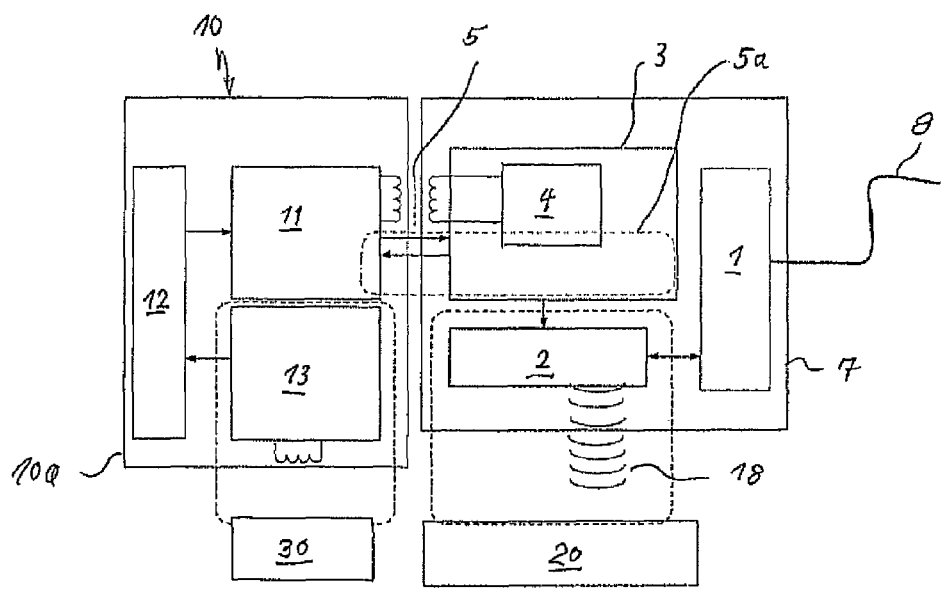
FIG. 6, a block diagram of a power supply system as a last sample embodiment of the invention.

The sample embodiment of FIG. 6 differs from that of FIG. 5 in that the power supply adapter 10 has in a housing 10a, besides a power transmitter 11 and an accumulator 12 for the power supply of the power transmitter 11, also a power receiver 13, which is inductively coupled to an external charging unit 30 for the power transfer. The power receiver 13 is connected to the accumulator 12, so that the energy transferred from the charging unit 30 is stored in this accumulator 12, i.e., the accumulator 12 is charged with this transferred energy from the power receiver 13.

List of Reference Symbols
1 field device
2 radio module of the field device 1
3 power supply unit
4 power receiver of the power supply unit 3
5 inductive coupling
5a communication connection
6 communication connection
7 housing
8 process wiring
10 power supply adapter
10a housing of the power supply adapter 10
11 power transmitter of the power supply adapter 10
12 energy storage unit, battery, accumulator
13 of the power supply adapter 10
14 of the power supply adapter 10
15 of the power supply adapter 10
16 communication interface
16a USB cable
17 of the power supply adapter 10
18 wireless communication connection
20 control and monitoring unit
30 external charging unit Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A power supply system, for a field device, comprising:
a power supply system operably connected to a wire-line network with a radio module that is operably configured for data communication with an external unit, wherein said radio module is connected to said field device and has a power supply unit;
said power supply system, further comprising:
a power supply adapter which has a power transmitter for the wireless power transfer to the power supply unit, said power supply adapter operably including a power receiver for a wireless power transfer from an external charging unit,
wherein said power supply unit is operably configured with a power receiver, and said power receiver and said power transmitter are operatively inductively coupled for the power transfer, and
wherein the power transmitter of the power supply adaptor and the power receiver are operative such that when the power transmitter and the power receiver are operatively inductively coupled for the wireless power transfer, a communication connection is also realized, the communication connection providing at least one of an authentication, a thermal checking, and a transmission of charge status.

2. The power supply system, according to claim 1, wherein:
said power supply adapter is operably configured with an energy storage unit for said power supply to said power transmitter.

3. The power supply system, according to claim 2, wherein:
said power receiver is configured to supply an energy received from the external charging unit to the storage of the energy storage unit.

4. The power supply system, according to claim 1, wherein:
said power supply adapter is configured with a radio module, and
said power supply adapter with said radio module is operably configured as an external unit to carry out a data communication with said radio module of said field device.

5. The power supply system, according to claim 4, wherein:
said power supply adapter is configured with an energy storage unit for effecting operative power supply to said power transmitter and said radio module.

6. The power supply system, according to claim 4, wherein:
said power supply adapter has a communication interface, and a control and monitoring unit is provided that is operatively configured the data communication via the communication interface with the radio module of the power supply adapter.

7. The power supply system, according to claim 5, wherein:
said power supply adapter has a communication interface, and
control and monitoring unit is provided that is operatively configured for a data communication via said communication interface with said radio module of said power supply adapter.

8. The power supply system, according to claim 6, wherein:
said communication interface is configured for a wireless data transfer.

9. The power supply system, according to claim 6, wherein:
said communication interface is configured for a wire-line data transfer.

10. The power supply system, according to claim 8, wherein:
said communication interface is configured for a wire-line power transfer.

11. The power supply system, according to claim 4, wherein:
said power supply adapter is operably configured with a microprocessor operative for control of said data communication of said radio module with said external control and monitoring unit.

12. The power supply system, according to claim 5, wherein:
said power supply adapter is operably configured with a microprocessor operative for control of said data communication of said radio module with said external control and monitoring unit.

13. The power supply system, according to claim 6, wherein:
said power supply adapter is operably configured with a microprocessor operative for control of said data communication of said radio module with said external control and monitoring unit.

\* \* \* \* \*